United States Patent [19]

Bienvenu et al.

[11] Patent Number: 4,724,120

[45] Date of Patent: Feb. 9, 1988

[54] METHOD FOR THE ASSEMBLY OF AND THE INTERCONNECTION BY DIFFUSION OF BODIES OF METAL ALLOYS

[75] Inventors: Yves C. Bienvenu, Evry, France; Thierry J. M. E. Massart, Court St. Etienne, Belgium

[73] Assignees: Association pour la Recherche et le Developpement des Methodes et Processus Industriels "A.R.M.I.N.E.S."; Societe Nationale d'Etude et de Construction de Moteurs d'Aviation "S.N.E.C.M.A.", both of Paris, France

[21] Appl. No.: 920,134

[22] Filed: Oct. 17, 1986

[30] Foreign Application Priority Data

Oct. 18, 1985 [FR] France ............................. 85 15926

[51] Int. Cl.$^4$ .............................................. G22F 7/00
[52] U.S. Cl. ........................................ 419/8; 228/194;
228/195; 228/203; 228/205; 228/228; 419/35;
419/49; 419/54; 428/564; 428/565
[58] Field of Search .................... 419/8, 35, 49, 54;
228/194, 195, 228, 205, 203; 428/564, 565

[56] References Cited

U.S. PATENT DOCUMENTS

| | | |
|---|---|---|
| 3,753,794 | 8/1973 | Paulonis et al. ............... 148/32 |
| 3,969,110 | 7/1976 | Plegat ............................ 420/571 |
| 4,032,059 | 6/1977 | Plegat ............................ 228/183 |
| 4,228,944 | 10/1980 | Inamura et al. ............... 228/198 |
| 4,235,649 | 11/1980 | Inamura et al. ............... 148/24 |
| 4,426,404 | 1/1984 | Shoher et al. ................. 228/209 |
| 4,585,617 | 4/1986 | Tenhover et al. ............. 419/5 |

FOREIGN PATENT DOCUMENTS

| | | |
|---|---|---|
| 2380354 | 9/1978 | France . |
| 2455944 | 12/1980 | France . |
| 909314 | 10/1962 | United Kingdom . |
| 2081155 | 2/1982 | United Kingdom . |

Primary Examiner—Stephen J. Lechert, Jr.
Attorney, Agent, or Firm—Oblon, Fisher, Spivak, McClelland & Maier

[57] ABSTRACT

A method for the assembly and connection of bodies, massive parts or powder grains, of alloys comprising at least 50% of nickel, cobalt or iron, comprises a preliminary operation of deposition at the interface of the said bodies of a product of the type $MBF_x$, x being equal to 3 or 4, M designating a radical of the type $NH_4$ giving off when hot a gaseous component such as $NH_3$ or a metallic element and a sequence of treatment of cleaning/activation by passage of the coated body at a temperature in excess of the temperature of sublimation of the said product.

12 Claims, 7 Drawing Figures

METHOD FOR THE ASSEMBLY OF AND THE INTERCONNECTION BY DIFFUSION OF BODIES OF METAL ALLOYS

BACKGROUND OF THE INVENTION

1. Field of the Invention

The present invention relates to a method for the assembly of and the interconnection by diffusion of bodies of metal alloys. More particularly the invention relates to methods of the kind comprising a sequence of activation of parts to be joined and a sequence of applying pressure when hot which gives rise to interconnection by interdiffusion of the solids.

2. Summary of the Prior Art

Metal alloys of which interconnection can be effected by these methods are alloys of the kind which are resistant to heat or to corrosion comprising, having in proportions by weight, at least 50% of a metal of the group nickel, cobalt and iron or an alloy of at least two of these metals. Certain of these alloys are designated by the term "super-alloys" and in such alloys the remainder is constituted by elements such as chromium, aluminum, molybdenum, titanium, tungsten, niobium, etc., which form a solid solution and form intermetallic compounds or alternatively form with carbon dispersed phases providing the required functional characteristics (mechanical strength and resistance to corrosion) at elevated temperatures. These alloys are used, for example, in the construction of turbo machines.

By "body", there is to be understood herein and in that which follows, simultaneously, and indifferently, either relatively large parts of predetermined shape and dimensions, for example intended to form a welded assembly, or powder grains intended for the production of parts by sintering and by compaction when hot. In practice, the interconnections, junctions or joints envisaged by the invention concern simultaneously, either two relatively large parts, or such a part and a powder, or powders, and, for the interconnection or joining of two relatively large parts, the invention is applicable whether or not an external deposit element is incorporated and which is constituted, for example, by a brazing compound. The assembly method and interconnection concerned thus encompasses different assembly and connection methods either by welding/diffusion, or by brazing/diffusion or by sintering or by compaction when hot. Briefly, the principles of these methods generally known to the man skilled in the art are will now be summarized.

The method of welding/diffusion involves welding the solid phase in which the parts are kept in contact under a given pressure and brought to a predetermined temperature, lower than the initiation of the melting temperature, over a predetermined time period. These operational conditions lead to local plastic deformations of the contact surfaces, which, in turn, give rise to an intimate contact of the latter thus rendering possible the migration of atoms between elements and/or recyrstallisations at the interface. In the ideal case, once the operation is completed no presently available technique enables the initial contact interface to be distinguished, whether this is considered from the microphotographic, chemical or mechanical aspects.

As for brazing/diffusion, it consists in the insertion between the two parts to be assembled of a thin layer (foil or powder) of an alloy particularly with a nickel base comprising additions (fluxes) such that the temperature of the liquids of the alloy will be less than the temperature of the initiation of melting of the superalloy. Heating causes initially the fusion of this layer and its connection with the superficial contact layers of the parts, then the reduction in the local proportion of the or each flux by migration into adjacent zones of the parts. In fact, it does not relate to a welding method by solids interdiffusion but the application of a known brazing technique then the diffusion of the fluxes of the brazing material in order to elevate the temperature of fusion of the connecting layer.

Sintering is likewise shown to be of interest for the production of parts of super-alloys, given the difficulties encountered during the use of conventional methods such as machining or forging. Sintering enables the production of complex shaped parts starting from a superalloy powder which, after having been shaped, is submitted to the operation of sintering itself. The latter consists either in heating the powders to a predetermined temperature after compaction when cold in a mould or matrix, or to place the powders under pressure at a predetermined temperature, lower than the temperature of commencement of melting fusion or the latter enables the production of a consolidation of the part by a phenomenon analagous to welding by diffusion at the zone of each grain. The physical and mechanical properties of the sintered parts clearly depend upon the quality of the junctions or connections formed between the powdered grains.

The assembly of the bodies can be carried out either between similar materials, or between different materials by their composition or their nature: a dense material and a powdered material for example.

The superior mechanical characteristics of the alloy used, are accompanied on the negative side by difficulties of fabrication of the parts or of the assemblies, especially by sintering or diffusion welding.

It is in practice apparent during tests of the mechanical strength of assemblies of parts of alloys welded by diffusion, and micrographic examination, that for certain grades of super-alloys or for certain special alloys of the non-oxidizing type, the connection produced after welding by diffusion is of mediocre quality; similarly the strength of sintered parts produced by super-alloys is poor, the cohesion of the assembly being less than values conventionally obtained. In certain cases no joint or connection is possible.

Observations based on electron microscope pictures, and the study of constituents by microanalysis have enabled evidence to be produced that these defects were due to the formation in the superficial contact layers of segregations or precipitates which may harm and even prevent diffusion. These segregations or precipitations result from the migration of certain constituents during the increase in temperature preceding the operation which effects the joint or connection.

This phenomenon of the formation of a barrier to diffusion is more particularly apparent for super-alloys containing, in addition to a non-negligeable amount of carbon, a relatively high quantity of titanium, for example upwards of 0.15% of carbon and 1.5% of titanium. It has been shown in this case, after diffusion welding, for example on one hand the presence in the interface of a quasi-continuous boundary formed by segregation of titanium compounds comprising especially carbon and titanium and, on the other hand, the absence of recrystallisation. FIG. 1a shows a microphotograph, obtained at an enlargement of 2500 times, at one example of an assembly of parts in which the phenomena hereinbefore noted may be observed. Mechanical tests confirm that the joint or connection thus produced is defective.

In French Patent Specification No. 2 380 354, with the object of resolving these difficulties, a preparatory treatment before the connection operation is proposed, consisting in a roughening treatment by heating in an enclosure where a hydro-halogen atmosphere is circulated composed of a mixture of hydrogen and of a hydrogen halide. French Patent Specification Nos. 1 170 557 and 1 243 415 also set out the conditions for carrying out the treatment in a fluoride atmosphere produced from chromium fluoride and ammonium fluoride in the form of a cement in the treatment enclosure obtained under a reducing atmosphere, for example of hydrogen. The use of the atmosphere of hydrogen can, however, lead to certain difficulties and constraints particularly the way of putting the technique into practice.

SUMMARY OF THE INVENTION

According to the present invention, there is provided a method of assembly and joining by diffusion of bodies of metallic alloys comprising in proportions by weight at least about 50% of at least one metal of the nickel, cobalt and iron group, the method comprising the step of a preliminary deposition at the interface of the said body of a compound of the formation $MBF_x$ where x is selected within the group of values 3 and 4 and where M designates one of the group a radical of the type $NH_4$ capable of forming when hot gaseous removal as $NH_3$, and a metallic element, and cleaning/activation by a period of treatment of the said body at a temperature in excess of the sublimation temperature of the said compound, for a duration of at least about five minutes.

Preferably, the cleaning/activation step comprises a period between about 250° C. and 500° C. for a time period in the range of 15 to 30 minutes.

This treatment enable the "softening" of the said material of the body to be assembled by reaction of the fluoroborate so as to eliminate, in the form of volatile components, the elements which have the tendency to constitute obstacles to the formation of a clean joint or junction. It also assists the activation of the connection by solid interdiffusion.

An explanation of the phenomenon and of the results obtained can be found in part in reactions of a chemical nature which were observed during the practice of the method in accordance with the invention. Under the treatment conditions, there is obtained thus a decomposition of the product utilized, $MBF_4$ in accordance with the following chemical reaction:

$$MBF_4 \rightarrow MF = BF_3$$

When a product of the kind $MBF_3$ is used, the reaction becomes:

$$MBF_3 \rightarrow M = BF_3$$

and in the two cases the reaction is followed for example under the hypothesis where the titanium or the aluminum which are undesirable form an obstacle to the connection as is known:

on the one hand, $$BF_3 = Ti \rightarrow TiF_a = B$$

on the other hand, $$MF = Ti \rightarrow M = TiF_b$$

The products obtained of the fluoride type $TiF_a$ or $TiF_b$ are volatile and eliminate themselves as a result. The same reactions are observed for aluminum. According to the invention M represents a radical of the $NH_4$ type or a metal. When M is a metal, it deposits at the interface of the bodies to be assembled and associates with the alloy under consideration during subsequent steps of assembly and junction by solid interdiffusion. When M is a radical of the type $NH_4$, it also eliminates by gaseous evaporation, as $NH_3$ for example.

The metal M in the formula $MBF_3$ or $MBF_4$ may be the metal of the bodies to be joined or bonded.

A deposit of boron is produced at the interface of the bodies to be assembled and this element has the effect of activation with a view of the realization of the connection by solid interdiffusion.

In practice, in the range of temperatures provided in practice, an observed reaction also gives:

$$BF_3 \rightarrow BF_2 = F$$

It will be noted in consequence that at the preferred formulation of the product used, $MBF_4$ can also be substituted with a formulation $MBF_3$ leading to the same results by gaseous evaporation of the compounds $BF_3$ or $BF_2$, depending upon the temperature range.

Preferably, the product used of the fluoroborate type is deposited either in solid form, or in the form of a suspension, for example in an alcohol, or in a dissolved form. In the latter case, at the commencement of sintering, evaporation results, causing the deposit of fluoroborate and the initiation of reactions hereinbefore noted.

The method has the important advantages, for example of ease of practical application and gain in productivity, by enabling during the course of a single cycle of treatment, simultaneously, the preparation of the surface of the faces to be assembled and during the course of the assembly/connection operation, the activation method, while at the same time ensuring an excellent quality junction and final product produced.

DESCRIPTION OF THE PREFERRED EMBODIMENTS

Figure 1A:
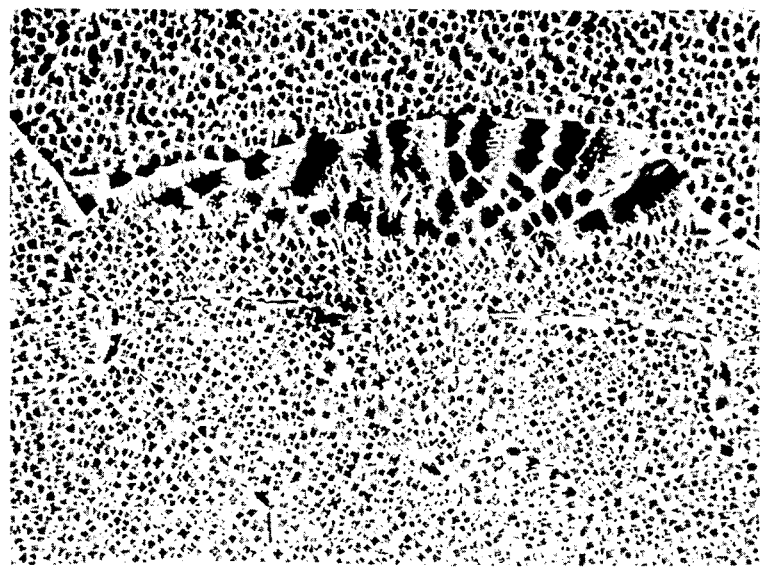
FIG. 1a already referred to hereinbefore is a microphotograph, at an enlargement of 2500 times of a junction zone between two parts of an assembly produced according to a method proposed prior to the present invention.

Various examples of the application of the method of assembly and joining or connection by diffusion of bodies, in the form of relatively large parts or of powder grains will now be described. The cleaning/activation treatment according to the invention, in all its applications, is integrated directly within the operational range provided in generally conventional methods of which some have been referred to hereinbefore.

EXAMPLE I

Method of Welding/Diffusion

Several tests were carried out with a view to the junction by welding/diffusion of relatively large parts, each of a different alloy, for example NC10K15 (of commercial designation IN100) and NK17CDAT (marketed under the trade name ASTRALOY) or alloys of commercial designations CMS-X2 and ASTRALOY.

All of these alloys comprise in proportions by weight of at least 50% of a metal of the nickel, cobalt and iron group, or an alloy of at least two of these metals.

In each test, an operational sequence comprising the following steps was followed:

(a) mechanical polishing of the faces of the parts to be assembled, (b) degreasing of the parts, (c) application of the product $NH_4BF_4$, of the tetrafluoroborate type at the interface of the parts, (d) treatment under vacuum conditions in a muffled (furnace) of the assembly of elements comprising the following sub-steps:

(d1) heating up to about 500° C. with an increase in temperature of 10° C. per minute, without applying external pressure at the zone of the assembly, (d2) starting from about 500° C., applying pressure to the assembly by means of a fluid pressure actuator to 20 bars and increasing the temperature up to a level in the range about 950° to 1200° C., the actual temperature being determined as a function of the alloys present, (d3) maintenance of the temperature and of the pressure for a period in the range from about two to four hours, (d4) cooling under vacuum conditions over a period of from about two to four hours.

Tests have been demonstrated that good results are obtained by applying during the step (c) quantities of a compound of the tetrafluoroborate type ranging from about 10 to 100 mg/cm$^2$.

Chemical tests were carried out on welded parts, with examinations of the microphotographs and ultrasonic analyses of the weld zones.

In parallel comparative tests were carried out on sample test pieces of identical constitution and assembled under the same conditions of the operational sequence or welding/diffusion while omitting step (c), that is to say, without deposit of the tetrafluoroborate compound at the interface of the parts. The results obtained corresponding to the method according to the invention and to a method which does not incorporate the steps of the present invention are assembled together in the table given hereinafter:

Bending Tests on a Welded Test Piece

|  | Load applied in daN | Bending Angle |
| --- | --- | --- |
| Test Piece A (method according to the invention) | 161 | 86° |
| Test Piece B (without the step c in the operational sequence) | 152 | 74° |

It will be observed that on the test piece A made in accordance with the invention a rupture outside of the weld zone occurred while for the test piece B, not in accordance with the invention, the rupture occurred at the junction zone.

FIG. 1a is a microphotograph which, by applying a method welding/diffusion without the treatment of cleaning/activation by deposition of a tetrafluoroborate type compound, it will be observed that there is a clearly defined boundary in the weld zone and the absence of a true junction or joint.

Figure 1B:
FIG. 1b is a microphotograph at an enlargement of 2500 times, similar to FIG. 1a, of a junction zone between two parts in an analagous assembly to that illustrated in FIG. 1 but produced by the method according to the present invention.

In FIG. 1b similarly to FIG. 1a, but obtained by applying a welding/diffusion process including a treatment of cleaning/activation by deposition of a tetrafluoroborate compound it will be noted that there is a complete junction or joint between the two parts and the absence of any well defined boundary.

Figure 2A:
FIG. 2a is a microphotograph, at an enlargement of 650 times, of a rupture face of a test piece of which the junction has been produced by a method proposed prior to the present invention.
Figure 2B:
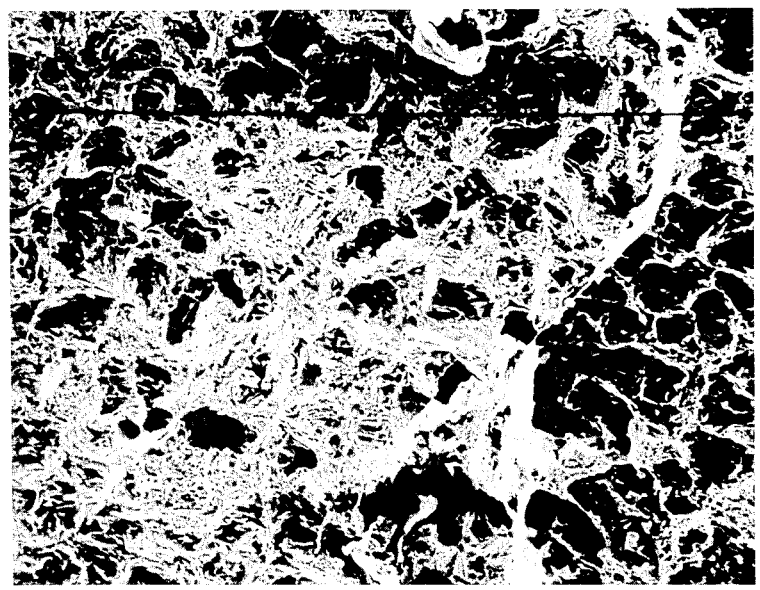
FIG. 2b is a microphotograph, at an enlargement of 650 times, of a rupture face of a test piece, similar to FIG. 2a, but of which the junction has been produced by the method according to the present invention.

FIG. 2a illustrates a microphotograph at a magnification of 650 times test piece B which has been produced by the method in accordance with the invention while FIG. 2b illustrates a microphotograph at a magnification of 650 times test piece A which does not include steps in accordance with the inventive method.

EXAMPLE II

Method of Sintering of Powders

In tests for the application of the method according to the invention to the sintering of powders, a preliminary preparation of the powders is carried out, comprising the following steps:

(a) immesion of the powders in an alcohol suspension of a compound of the tetrafluoroborate type, (b) drying of the powders, (c) deposition of the powders in shaping mould or matrix.

The alloys used in this example are nickel-based super-alloys, specifically ASTROLOY and NICRALY (Registered Trade Marks).

The operational sequence then follows the conventional method for carrying out a sintering operation by pressing the powders when hot, but commences however by a treatment sequence of cleaning/activation by heating up to about 500° C. with an increase in temperature of about 10° C. per minute. The same observations as in Example I were made by comparing the results of the examination and of the analyses according to whether the treatment of cleaning/activation according to the invention was applied or was not applied.

Figure 3A:
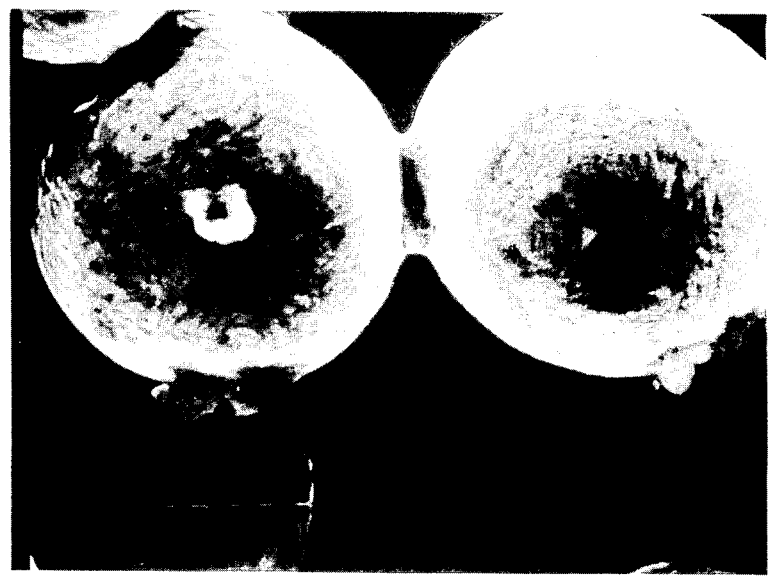
FIG. 3a is a microphotograph at an enlargement of 6000 times of a junction zone between two powder grains after a compaction operation, according to a method proposed prior to the present invention.
Figure 3B:
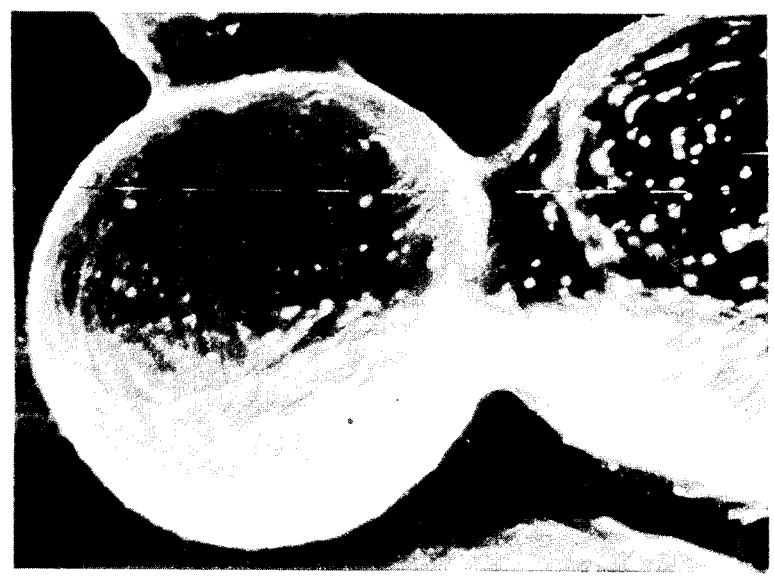
FIG. 3b is a microphotograph, similar to FIG. 3a, at an enlargement of 6000 times, likewise of a junction zone between two powder grains, but illustrating the application of the method according to the present invention.

When comparing FIGS. 3a and 3b of the analagous microphotographs, prepared at the same enlargement of 6000 times, it will be noted that when the method according to the invention is applied (FIG. 3b), the junction or joint between the two grains of powder is clearly improved and is more extensive.

Figure 3C:
FIG. 3c is a microphotograph, at an enlargement of 25000 times, of a powder grain surface to which the method in accordance with the invention has been applied.

The microphotograph of FIG. 3c shows evidence on the surface of a powder grain of a characteristic microstructure produced by application of a method according to the present invention having reliefs or roughness resulting from the development during the course of the treatment of cleaning/activation of liberation of gaseous or volatile components. On the contrary, when the method according to the present invention is not applied, only unitary or smooth surfaces without geometrical reliefs are observed (see FIG. 3a).

EXAMPLE III

Method for the Hot Isostatic Compaction of Powders

As in the Example II given hereinbefore, a preliminary preparation of the powders is effected by the application of the compound of tetrafluoroborate type. The alloys are nickel-based super-alloys. The current sequence of application of this method comprises, before placing the powders into the container, a degassing treatment. In the method according to the invention, this degassing treatment comprises a squence of cleaning/activation by heating up to about 500° C. with an increase in temperature of about 10° C. per minute followed by placing in the container without returning to ambient air. The same improvement in the results as in the hereinbefore given Examples has also been confirmed by applying the method according to the invention to the hot isostatic compaction of the powders.

EXAMPLE IV

Brazing/Diffusion Method

The application of the invention consists in this case in the association of the compound of the tetrafluoroborate type to brazing material which is inserted between relatively large parts to be assembled and to include in the cycle an increase of temperature in the muffle (furnace) to heating up to about 500° C. at a rate of about 10° C. per minute followed by the application of squeezing pressure at from about 500° C. This application leads to a further improvement in the results obtained. The alloys employed were nickel-based super-alloys, specifically an alloy disclosed in U.S. application Ser. No. 679,766.

Treatment operations in the muffle (furnace) under vacuum conditions were mentioned hereinbefore in the Examples described, but it will be apparent that in accordance with the applications envisaged, these treatments can also be carried out within an enclosure with a neutral atmosphere.

The method according to the invention also comprises applications based on combinations of certain of the Examples described. For example, the operation of densification of powder by pressing when hot can be associated with welding/diffusion when joining to a relatively large part, the treatment of cleaning/activation by a compound of the tetrafluoroborate type also applying to this application by incorporation in the operational sequence.

What is claimed is:

1. A method of assembly and joining by diffusion of bodies of metallic alloys comprising in proportions by weight at least about 50% of at least one metal of the nickel, cobalt and iron group, the method comprising the steps of depositing at the interface of said bodies a compound of the formula $MBF_x$ where x is selected from the group consisting of values 3 and 4 and where M is selected from the group consisting of a radical of the type $NH_4$ capable of forming when hot gaseous removal as $NH_3$, and a metallic element, and cleaning/activation by treatment of said body at a temperature in excess of the sublimation temperature of said compound, for a duration of a least about five minutes.

2. A method according to claim 1, wherein the compound is a tetrafluoroborate of ammonia of chemical formula $NH_4 BF_4$.

3. A method according to claim 2, wherein the cleaning/activation comprises a period of between about 250° C. and 500° C. for a time of fifteen to thirty minutes.

4. A method of according to claim 1, wherein in said compound M is a metallic element which is the metal of the base of at least one of the said bodies to be assembled.

5. A method according to claim 1, wherein the fluoroborate $MBF_x$ is deposited in the form of a solid at the interface of the bodies to be joined.

6. A method according to claim 1, wherein the fluoroborate $MBF_x$ is deposited at the interface of the bodies to be assembled by application of a suspension of the said fluoroborate in an alcohol.

7. A method according to claim 1, wherein the fluoroborate $MBF_x$ is applied at the interface of the bodies to be assembled in the form of a solute.

8. A method of joining by diffusion two parts each made of an alloy comprising in proportions by weight at least about 50% of at least one metal of the nickle, cobalt and iron group, the method comprising the steps of:

(a) mechanical polishing of the faces to be assembled of the two parts, (b) degreasing of the said parts, (c) applying a compound with a fluoroborate base $MBF_x$ at the interface, and (d) treatment under vacuum in a muffle of the constituents of the said assembly comprising the following sub-steps:

(d1) heating up to about 500° C. with an increase in temperature of about 10° C. per minute, without exerting external pressure at the interface zone of the assembly, (d2) at about 500° C., subjecting the assembly to a pressure at least of up to 20 bars within a temperature range of from about 950° C. to 1200° C., the temperature being determined as a function of the alloys present, (d3) maintaining the temperature and the pressure for a period of from about two to four hours, and (d4) cooling under vacuum conditions for a period of about two to four hours, thereby producing between the two parts a welded joint by solid interdiffusion.

9. An assembly and connection method by diffusion of actual powders of an alloy comprising in proportions by weight of at least abotu 50% of at least one metal of the nickel, cobalt and iron group, the method comprising the steps of:

(a) immersing of the powders in a suspension of fluoroborate $MBF_x$ in an alcohol, (b) drying of the powders, (c) depositing the powders in a mould,
(d) treatment by heating up to about 500° C. with an increase in temperature of about 10° C. per minute, and
(e) sintering comprising hot pressing of the powders, whereby to produce a part the shape and in which the densification is obtained by sintering.

10. A method according to claim 1, wherein the bodies are powder grains and the method comprises the steps of:
   (a) depositing on the powder grains fluoroborate of type $MBF_x$,
   (b) degassing treatment comprising an initial sequence of heating up to about 500° C. with a rate of increase in temperature of about 10° C. per minute,
   (c) depositing the degassed powder in a container, and
   (d) compaction treatment by isostatic compression when hot.

11. A method according to claim 1, wherein one body is a relatively large part and the other body is powder grains, the method comprising applying the powder grains to the said part before the said treatment steps so as to provide densification of the powder by pressing when hot associated with a welding/diffusion between the said part and the part produced from the powder.

12. A method according to claim 1, wherein the method further includes insertion of the braze metal between the bodies to be assembled associated with the said compound of the floroborate type $MBF_x$, the bodies are heated up to about 500° C. at the rate of about 10° C. per minute with the application of squeeze pressure from about 500° C.

* * * * *

UNITED STATES PATENT AND TRADEMARK OFFICE
CERTIFICATE OF CORRECTION

PATENT NO. : 4,724,120

DATED : FEBRUARY 9, 1988

INVENTOR(S) : YVES C. BIENVENU, ET AL

It is certified that error appears in the above-identified patent and that said Letters Patent is hereby corrected as shown below:

Column 1, line 49, "art are will" should read --art will--;

lines 59-60, "recyrstal-lisations" should read --recrystallizations--.

Column 2, line 60, "non-negligeable" should read --non-negligible--.

Column 3, line 8, "in" should read --of--;

line 40, "enable" should read --enables--;

line 54, "$MBF_4 \rightarrow MF=BF_3$" should read --$MBF_4 \rightarrow MF + BF_3$--;

line 67, "$BF_3=Ti \rightarrow TiF_a=B$" should read --$BF_3 + Ti \rightarrow TiF_a + B$--;

Column 4, line 3, "$MF=Ti \rightarrow M=TiF_b$" should read --$MF + Ti \rightarrow M + TiF_b$--;

line 24, "$BF_3 \rightarrow BF_2=F$" should read --$BF_3 \rightarrow BF_2 + F$--;

line 56, "analagous" should read --analogous--;

Column 6, line 51, "immesion" should read --immersion--.

Column 7, line 1, "analagous" should read --analogous--.

Column 8, line 10, "sublimination" should read --sublimation--.

UNITED STATES PATENT AND TRADEMARK OFFICE
CERTIFICATE OF CORRECTION

PATENT NO. : 4,724,120

DATED : FEBRUARY 9, 1988

INVENTOR(S) : YVES C. BIENVENU, ET AL

It is certified that error appears in the above-identified patent and that said Letters Patent is hereby corrected as shown below:

Column 8, line 11, "of a" should read --of at--;

line 63, "abotu" should read --about--;

Column 9, line 11, "grains" should read --grains a--.

Column 10, line 14, "C." should read --C--;

line 15, "C." should read --C--.

Signed and Sealed this

Fourteenth Day of February, 1989

Attest:

DONALD J. QUIGG

*Attesting Officer*     *Commissioner of Patents and Trademarks*